United States Patent
Van Lith et al.

(10) Patent No.: US 7,029,411 B2
(45) Date of Patent: Apr. 18, 2006

(54) DRIVING BELT AND TRANSVERSE ELEMENT FOR A DRIVING BELT

(75) Inventors: Johannes Hendrikus Van Lith, Berlicum (NL); Jeroen Herman Van Liempd, Bavel (NL); Marco Van Schaik, Breda (NL)

(73) Assignee: Van Doornes's Transmisse B.V., Tilburg (NL)

( * ) Notice: Subject to any disclaimer, the term of this patent is extended or adjusted under 35 U.S.C. 154(b) by 299 days.

(21) Appl. No.: 09/883,364

(22) Filed: Jun. 19, 2001

(65) Prior Publication Data

US 2001/0056002 A1 Dec. 27, 2001

(30) Foreign Application Priority Data

Jun. 21, 2000 (EP) .................................. 1015489

(51) Int. Cl.
*F16G 5/16* (2006.01)

(52) U.S. Cl. ...................................... 474/201
(58) Field of Classification Search ................ 474/201, 474/202, 238, 242, 244, 245
See application file for complete search history.

(56) References Cited

U.S. PATENT DOCUMENTS

| | | | |
|---|---|---|---|
| 3,949,621 A | | 4/1976 | Beusink et al. |
| 4,386,921 A | * | 6/1983 | Roberts ....................... 474/201 |
| 5,123,879 A | * | 6/1992 | Lecouturier et al. ........ 474/242 |
| 5,169,369 A | * | 12/1992 | Masuda et al. ............. 474/242 |
| 6,146,294 A | * | 11/2000 | Bolz ........................... 474/70 |

FOREIGN PATENT DOCUMENTS

| | | | |
|---|---|---|---|
| EP | 0014013 | | 8/1980 |
| EP | 0143293 | | 6/1985 |
| EP | 0278545 | | 8/1988 |
| EP | 1-247841 | | 10/1989 |
| GB | 421804 | * | 4/1991 |
| JP | 58-24640 | * | 2/1983 |
| JP | 62-106147 | * | 5/1987 |
| JP | 1-247841 | * | 10/1989 |
| JP | 2-118229 | * | 5/1990 |
| JP | 5-209652 | * | 8/1993 |
| JP | 6-94082 | * | 4/1994 |
| JP | 6-94083 | * | 4/1994 |

* cited by examiner

*Primary Examiner*—Richard W. Ridley
*Assistant Examiner*—Vicky A. Johnson
(74) *Attorney, Agent, or Firm*—Young & Thompson

(57) ABSTRACT

A driving belt for use in a continuously variable transmission comprising two V-shaped pulleys, which driving belt comprises a carrier consisting of two endless band packages lying side by side, on which transverse elements are disposed. Each transverse element includes two recesses positioned opposite each other for receiving the band packages, wherein a part of the transverse element is positioned between said band packages. The front side of the transverse element includes a projection, which can mate with a recess in the adjacent transverse element. Said projection and said recess are at least partially formed in the aforesaid part of the transverse element.

7 Claims, 1 Drawing Sheet

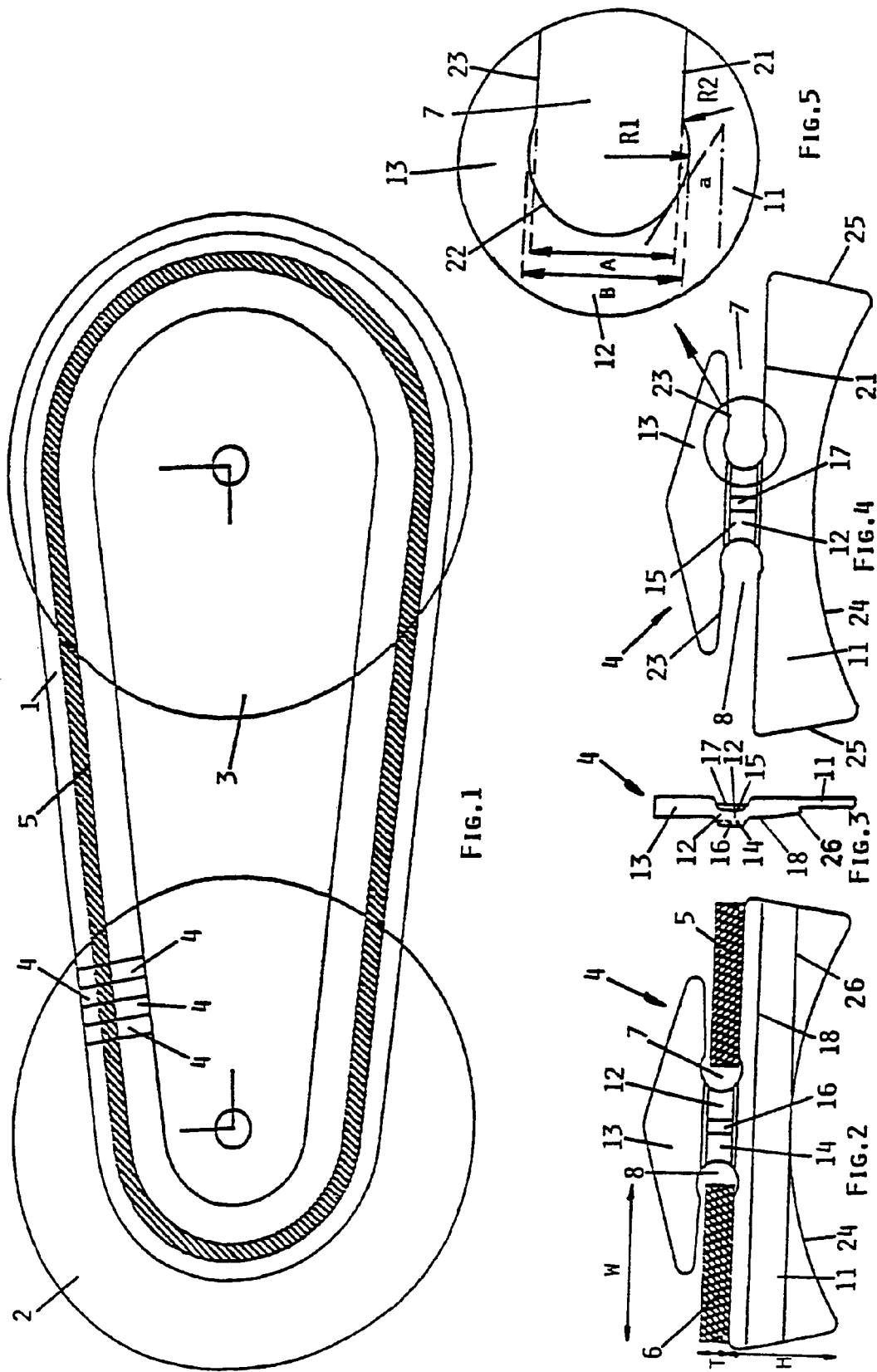

DRIVING BELT AND TRANSVERSE ELEMENT FOR A DRIVING BELT

BACKGROUND OF THE INVENTION

The invention relates to a driving belt for use in a continuously variable transmission comprising two V-shaped pulleys, which driving belt comprises a carrier consisting of two endless band packages lying side by side, on which transverse elements are disposed, wherein each transverse element includes two recesses positioned opposite each other for receiving the band packages, so that a first part of the transverse element extends under said band packages, a second part of the transverse element is positioned between said band packages and a third part of the transverse element extends above said band packages, wherein the front side of the transverse element includes a projection which can mate with a recess in the adjacent transverse element.

BACKGROUND OF THE RELATED ART

Such a driving belt is known from EP-A-0 014 013. The mating projection and recess ensure that transverse elements located adjacently to each other are correctly positioned with respect to each other during operation of the driving belt, especially in the straight part of the driving belt.

Each time a direction is described in relation to a transverse element, it is assumed that the transverse element occupies an upright position, as is shown in front elevation in FIG. 2. In said figure, the longitudinal direction is the direction perpendicularly to the plane of the figure.

The provision of the projection, and of the corresponding recess that is located on the other side of the transverse element, takes place through deformation of the material, wherein a stamp forms the recess by moving into the material. This causes the material to be deformed to such an extent that said projection is formed on the other side of the transverse element.

This is a relatively difficult operation. It would be easier to realise a profile wherein the projection and the recess extend in horizontal direction. Such a profile can be formed by means of a rolling operation, for example, or by a grinding operation. When the transverse elements are cut from a strip of material, said strip of material can be provided with such a profile in advance.

Although a projection/recess, which extends in horizontal direction, has advantages when forming the same, it has become apparent in practice that such a projection/recess is not always satisfactory.

A projection and a recess which extend in horizontal direction have a surface which is substantially made up of a series of horizontal lines extending in transverse direction with respect to the driving belt.

SUMMARY OF THE INVENTION

The object of the invention is to provide an improved driving belt, which driving belt is easier to manufacture and/or which operates more efficiently and/or more reliable.

Another object of the invention is to create a possibility to make the third part of the transverse element smaller, and thus lighter.

In order to accomplish that objective, said projection extends in horizontal direction, and wherein the rear side of the transverse element includes a recess which likewise extends in horizontal direction, wherein said projection and said recess are at least partially formed in the second part of the transverse element.

Said projection may be straight, but also elliptic or barrel-shaped.

By forming the projection at least partially in the second part of the transverse element, the length of the projection (its dimension in horizontal direction) at least at the bottom side of the projection is limited to the width of the aforesaid second part. In practice it has become apparent that this enables the driving belt to function better than in the situation wherein the projection extends over the entire width of the transverse element, that is, wherein the projection is formed in a part of the transverse element that is considerably wider than said second part.

From U.S. Pat. No. 3,949,621 it is known per se to form the projection in the second part of the transverse element. The projection that is used therein, however, is a projection which is round when seen in front view, that is, said projection does not extend in horizontal direction. The consequence is, therefore, that the second part must have a considerable width in order to make it possible to form the projection therein. The fact of the matter is that sufficient material must be present around the projection to be formed in order to enable correct deformation of material upon formation of the projection.

Preferably, said projection and said recess are present in large part in the second part of the transverse element, and more preferably said projection and said recess are mainly present in the second part of the transverse element. Owing to the limited length (in horizontal direction) of the projection and the recess, the connection that is thus obtained between transverse elements positioned adjacently to each other appears to function well in practice.

Preferably, said projection and said recess extend in transverse direction over the entire area of the transverse element between the two recesses.

Preferably, said projection is disposed some distance above the tilting line, which is the horizontally extending area of the surface of the transverse element that is constantly in contact with the adjacent transverse element. The tilting line is located under the band packages, and it is formed by a rounded corner in the surface of the transverse element.

Preferably, said projection is spaced from the tilting line by a distance, which is smaller than the smallest vertical dimension of the recess.

In one embodiment, the surface of the projection and of the recess comprises parts which extend at an angle to a horizontal line in the plane in which the band packages lie, and which extends perpendicularly to the direction of the driving belt. When such a part of the projection mates with a corresponding part of the recess, it is possible to reduce the extent to which two abutting transverse elements can move in horizontal direction relative to each other. In that case the surface of the projection and the recess in not entirely made up of a collection of horizontal lines, but it comprises a part that is different therefrom. Preferably, such a part of the projection is in the form of a recess in the surface, which recess preferably extends in vertical direction, as will be explained in more detail by means of an exemplary embodiment.

In another preferred embodiment, said third part of the transverse element comprises the aforesaid parts, which extend at an angle to the aforesaid line.

Preferably, the transverse element is made from a strip of material by means of a cutting operation, and the edges of the transverse element have been deburred and/or been rounded by means of a tumbling operation, wherein the surface of the transverse elements is worked with hard elements.

The invention furthermore relates to a transverse element for use in a driving belt for a continuously variable transmission comprising two V-shaped pulleys, which transverse element includes two recesses positioned opposite each other for receiving band packages forming a carrier, so that a first part of the transverse element extends under said band packages, a second part of the transverse element is positioned between said band packages and a third part of the transverse element extends above said band packages, wherein each recess includes an inside surface facing towards the band package, wherein said projection extends in horizontal direction, and wherein the rear side of the transverse element includes a recess which likewise extends in horizontal direction, wherein said projection and said recess are at least partially formed in the second part of the transverse element.

In order to explain the invention more fully, an exemplary embodiment of a driving belt will be described hereafter with reference to the drawing.

BRIEF DESCRIPTION OF THE DRAWINGS

FIG. 1 is a schematic side view of a driving belt;
FIG. 2 is a front view of a transverse element;
FIG. 3 is a side view of the transverse element;
FIG. 4 is a rear view of the transverse element; and
FIG. 5 is a view of a detail of FIG. 4.

DESCRIPTION OF THE PREFERRED EMBODIMENTS

The schematic illustration of FIG. 1 shows the driving belt 1, which runs over two pulleys 2, 3. In the illustrated situation, the left-hand pulley 2 rotates faster than the right-hand pulley 3. By changing the mutual distance between the two parts of which each pulley 2, 3 consists, it is possible to change the radius of the driving belt 1 at the location of pulley 2, 3, as a result of which the difference in speed between the two pulleys 2, 3 can be varied as desired. This is a well-known way of varying a difference in rotational speed between two shafts.

The driving belt 1, which is shown in side elevation in FIG. 1, is built up of a plurality of transverse elements 4 (four of which are shown in FIG. 1) and two band packages 5, 6, one of which is indicated by the shaded part in the figure. Both the transverse elements 4 and the bands of the band packages 5, 6 are made of a metal. The transverse elements 4 can move freely in the longitudinal direction of the band packages 5, 6, so that when a force is being transmitted between pulleys 2, 3, said force is transmitted by the transverse elements 4 pressing one against another. The band packages guide the transverse elements 4 thereby.

In the illustrated embodiment, each band package 5, 6 consists of five bands, as is shown in FIG. 2. In practice, a band package 5, 6 frequently comprises more bands, for example ten. In FIG. 2, the thickness of the band package 6 is indicated at T and the width is indicated at W. The thickness of a band is 0.2 mm, for example, with the width being 7 mm.

It will be apparent that the band packages 5, 6 cannot move out laterally, because parts of the pulleys 2, 3 are positioned on either side of the driving belt 1. From the figures it is apparent that the shape of transverse elements 4 has been selected so that said transverse elements are retained in position by the band packages 5, 6. Said shape comprises two recesses 7, 8, in which the band packages 5, 6 are accommodated.

Transverse element 4 consists of a first part 11, which extends under band packages 5, 6, a second part 12, which is located between band packages 5, 6, and a third part 13, which extends above band packages 5, 6.

The rear side of transverse element 4 (shown in FIG. 4) is substantially flat, and on its front side (shown in FIG. 2), transverse element 4 exhibits a so-called tilting line 18. The part of transverse element 4 above tilting line 18 has a substantially constant thickness, seen in side elevation (FIG. 3), whilst the first part 11 under tilting line 18 tapers off in downward direction. Tilting line 18 is in fact formed by a slightly rounded strip on the front side of transverse element 4, for example by an edge having a radius of curvature of 6 mm. Tilting line 18 is in contact with the rear side of the adjacent transverse element 4, both in the straight parts of driving belt 1 and in the curved parts thereof.

Below tilting line 18, first part 11 tapers off to an edge 26 extending in horizontal direction. First part 11 below edge 26 exhibits a constant thickness, which is about 0.1 mm less than the thickness of transverse element 4 just above edge 26.

As can be seen in particular in FIG. 3, the second part 12 of transverse element 4 is shifted to the left (in FIG. 3), as a result of which a projection 14 is formed on the front side of transverse element 4, whilst a recess 15 is present on the rear side. As is apparent from FIGS. 2 and 4, projection 14 and recess 15 extend in horizontal direction over the entire second part 12 of transverse element 4.

Projection 14 and recess 15 interlock in the straight parts of driving belt 1, as a result of which two abutting transverse elements 4 are prevented from shifting relative to each other.

As FIG. 2 shows, projection 14 is centrally provided with a recessed part 16, and FIG. 4 shows that recess 15 is centrally provided with a projecting part 17. In this manner, the surfaces of projection 14 and recess 15 include parts which extend at an angle to a horizontal line in the plane in which band packages 5, 6 lie, and which extends perpendicularly to the direction of driving belt 1.

In a straight part of the driving belt 1, the projecting part 17 comes into engagement with the recessed part 16, so that relative movement of two transverse elements 4 lying adjacently to each other is reduced or prevented altogether as a result of said parts including an angle coming into contact with each other.

As appears from the figures, projection 14 and recess 15 are located entirely in the second part 12 of transverse element 4, as a result of which their dimension in transverse direction (horizontal direction) is limited.

Each of the recesses 7, 8 is bounded by an inside surface that is formed by portions of first part 11, second part 12 and third part 13 of transverse element 4. Said portions are indicated by numerals 21, 22 and 23, respectively, in FIG. 5.

FIG. 5 is a detailed view of the shape of recess 7. Inside portion 21 includes a straight or slightly curved part at the location of first part 11 of transverse element 4, which part comes into contact with the band package 5. Said part merges with a convex portion thereof having a radius R2 into a concave portion of the inside surface having a radius R1 at the location where portion 21 of the inside surface merges with portion 22.

In the illustrated embodiment, R1 equals approximately half the distance B, which distance is the largest vertical dimension of recess 7 near the second part 12 of transverse element 4. The inside surface 22 at the location of second part 12 may exhibit a vertical, straight portion at the location of second part 12, but in the present embodiment said portion 22 of the inside surface is curved in its entirety, and that practically in the form of an arc having a radius R1.

In FIG. 5, letter A indicates the smallest vertical dimension of recess 7, which dimension is preferably larger than 80% of the largest vertical dimension B of recess 7 near the second part 12 of transverse element 4.

FIG. 5 shows angle a, which is the angle which the portion 22 of the inside surface that is formed by the second part 12 of transverse element 4 includes near the underside of band packages 5, 6 with the plane in which band packages 5, 6 lie. As is shown in FIG. 5, said angle is an acute angle, preferably of less than 85°.

In practice it has become apparent that the convex curvature having radius R2 must be sufficiently large, for example 0.4 mm or more. When the radius R2 is not large enough, damage to the innermost band of the band package 5, 6 may ensue. Also the radius R1 of the adjoining concave curvature must be sufficiently large. It has become apparent that when R1 is larger than 0.7 mm, the risk of fracture of the transverse element 4 is reduced to such an extent that the first part 11 of 64 may be smaller, that is, have less mass. It is possible thereby to reduce the distance between the lower edge 24 of transverse element 4 and the inside surface 21, 22 at the location of the aforesaid curvature significantly, that is, said distance can be much smaller than the height H of the surface 25 of transverse element 4 that comes into contact with pulleys 2, 3. Said reduction contributes to a satisfactory dynamic behaviour of the transverse element. Preferably, the lower edge 24 is concave over substantially its entire length. The above-described embodiment is merely an exemplary embodiment, many other embodiments are possible.

The invention claimed is:

1. A driving belt for use in a continuously variable transmission comprising two V-shaped pulleys (2, 3), which driving belt (1) comprises:
    a carrier consisting of two metallic endless band packages (5, 6) lying side by side, on which transverse metal elements (4) are disposed freely moveable in a longitudinal direction of the band, wherein,
    the transverse element is a cut single piece of material,
    each transverse element (4) includes two recesses (7, 8) positioned opposite each other for receiving the band packages (5, 6), so that a first part (11) of the transverse element (4) extends under said band packages (5, 6), a second part (12) of the transverse element (4) is positioned between said band packages (5, 6) and a third part (13) of the transverse element (4) extends above said band packages (5, 6),
    the front side of the first part (11) of the transverse element (4) includes a tilting line (18) extending in a horizontal direction and forming a transition between a part of the element at least including said third part (13) that has a substantially constant thickness as seen in side elevation and a further part of the element wherein said thickness tapers in a downward direction away from the tilting line (18), and includes a projection (14) which can mate with a recess (15) in the adjacent transverse element (4) in a manner allowing free movement of adjacent elements in the longitudinal direction of the belt,
    which recess (15) is a deformation recess on the rear side of the transverse element, the rear side being deformed to such an extent that the projection (14) is formed on the front side of the transverse element from displaced deformation material forming the recess,
    said projection (14) and said recess (15) extend in a horizontal direction over the entire dimension of the second part (12),
    said projection (14) and said recess (15) are mainly formed in the second part of the transverse element (4), and
    said projection (14) is disposed some distance above the tilting line (18), which distance is smaller than the smallest vertical dimension (A) of the recess (7, 8).

2. A driving belt according to claim 1, characterised in that said projection (14) and said recess (15) are entirely located in the second part (12) of the transverse element (4).

3. A driving belt according to claim 1, characterised in that edges of the transverse element (4) are deburred.

4. A driving belt according to claim 1, characterised in that edges of the transverse element (4) are rounded.

5. The belt of claim 1, wherein, a surface of the projection (14) comprises a recessed part (16), and the recess (15) comprises a projecting part (17), which recessed and projecting parts (16, 17) extend at an angle to a horizontal line in the plane in which the band packages (5, 6) lie.

6. A metallic transverse element for use in a driving belt, comprising:
    two recesses (7, 8) positioned opposite each other for receiving band packages (5, 6), so that a first part (11) of the transverse element (4) extends under said band packages (5, 6), a second part (12) of the transverse element (4) is positioned between said band packages (5, 6) and a third part (13) of the transverse element (4) extends above said band packages (5, 6),
    the transverse element being a cut single piece of material,
    the front side of the first part (11) of the transverse element (4) includes a tilting line (18) extending in a horizontal direction and forming a transition between a part of the element at least including said third part (13) that has a substantially constant thickness as seen in side elevation and a further part of the element wherein said thickness tapers in downward direction away from the tilting line (18), and includes a projection (14) which can mate with a recess (15) in the adjacent transverse element (4) in a manner allowing free movement of adjacent elements in a longitudinal direction of the belt,
    which recess (15) is a deformation recess on the rear side of the transverse element, the rear side being deformed to such an extent that the projection (14) is formed on the front side of the transverse element from the deformation forming the recess (15),
    said projection (14) and said recess (15) extend in a horizontal direction over the entire dimension of the second part (12),
    said projection (14) and said recess (15) are mainly formed in the second part of the transverse element (4),
    said projection (14) is disposed some distance above the tilting line (18), which distance is smaller than the smallest vertical dimension (A) of the recess (7, 8), and
    the element is metallic.

7. A driving belt for use in a continuously variable transmission comprising two V-shaped pulleys (2, 3), said driving belt (1) comprising:
    a carrier consisting of two metallic endless band packages (5, 6) lying side by side; and
    transverse metal elements (4) disposed freely moveable in a longitudinal direction of the band, wherein,
    the transverse element is a single piece of material, each transverse element (4) includes two recesses (7, 8) positioned opposite each other for receiving the band packages (5, 6) with i) a first part (11) of the transverse element (4) extending under said band packages (5, 6), ii) a second part (12) of the transverse element (4) positioned between said band packages (5, 6) and iii) a third part (13) of the transverse element (4) extending above said band packages (5, 6), a front side of the transverse element (4) includes a tilting line (18) extending in a horizontal direction and forming a transition between a part of the element at least including said third part (13) that has a substantially constant thickness as seen in side elevation and a further part of the element wherein said thickness tapers in a downward direction away from the tilting line (18), and a projection (14) which can mate with a recess (15) in an adjacent transverse element (4) in a manner allowing free movement of adjacent elements in the longitudinal direction of the belt, which recess (15) is a deformation recess over an entire width of the second part on the rear side of the transverse element, the rear side being deformed to such an extent that the projection (14) is formed on the front side of the transverse element from the deformation forming the recess, said projection (14) and said recess (15) extend in a horizontal direction over the entire dimension of the second part (12), said projection (14) and said recess (15) are mainly formed in the second part of the transverse element (4), and said projection (14) is disposed some distance above the tilting line (18), which distance is smaller than the smallest vertical dimension (A) of the recess (7, 8).

* * * * *